(12) United States Patent
Zhou et al.

(10) Patent No.: US 9,242,266 B2
(45) Date of Patent: Jan. 26, 2016

(54) ALIGNMENT FILM PRINTING DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yongshan Zhou, Beijing (CN); Chengtan Zhao, Beijing (CN); Jingpeng Li, Beijing (CN); Haiyun Lin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/360,155

(22) PCT Filed: Jun. 28, 2013

(86) PCT No.: PCT/CN2013/078468
§ 371 (c)(1),
(2) Date: May 22, 2014

(87) PCT Pub. No.: WO2014/139250
PCT Pub. Date: Sep. 18, 2014

(65) Prior Publication Data
US 2015/0217324 A1      Aug. 6, 2015

(30) Foreign Application Priority Data
Mar. 15, 2013   (CN) .......................... 2013 1 0084202

(51) Int. Cl.
*B05C 11/10* (2006.01)
*G02F 1/13* (2006.01)
(Continued)

(52) U.S. Cl.
CPC .............. *B05C 11/10* (2013.01); *B05C 11/115* (2013.01); *G02F 1/1303* (2013.01); *G02F 1/1337* (2013.01); *B05C 9/00* (2013.01); *B05C 9/04* (2013.01)

(58) Field of Classification Search
CPC ...... B41F 17/00; B41F 27/005; G02F 1/1341; G03F 9/00; B05C 9/00; B05C 9/04; B41J 29/393; B41J 2/175; B41J 11/42
USPC ............ 347/19, 104, 16, 14, 5; 101/481, 485; 118/46, 712
See application file for complete search history.

(56) References Cited

U.S. PATENT DOCUMENTS 7,131,555 B2 *   11/2006   Maruyama et al. ................ 222/1
2004/0228970 A1 *   11/2004   Maruyama et al. ........... 427/256
2008/0002137 A1 *   1/2008   Kim et al. ...................... 349/187

FOREIGN PATENT DOCUMENTS

CN         1576978 A       2/2005
CN         1769969 A       5/2006
(Continued)

OTHER PUBLICATIONS

Written Opinion of the International Searching Authority dated Dec. 13, 2013; PCT/CN2013/078468.
(Continued)

*Primary Examiner* — Laura Edwards
(74) *Attorney, Agent, or Firm* — Ladas & Parry LLP

(57) ABSTRACT

An alignment film printing device, configured to improve coating quality of an alignment film, includes at least one printing unit, and the printing unit each includes: a cylinder body with an opening at a bottom and an extract opening on a top; a vacuum extractor connected with the extract opening; a plunger provided inside the cylinder body, and configured to draw the alignment fluid from the opening to the cylinder body; a vacuum tester provided at the extract opening and configured to monitor a vacuum degree inside the cylinder body and above the plunger; a range finder provided inside the cylinder body and configured to monitor a distance from the plunger to a top of the cylinder body; and a control device in signal communication with the vacuum extractor, the vacuum tester and the range finder respectively and configured to control a volume of the alignment fluid drawn into the cylinder body according to test values of the vacuum tester and the range finder.

19 Claims, 2 Drawing Sheets

(51) Int. Cl.
   *G02F 1/1337* (2006.01)
   *B05C 11/115* (2006.01)
   B05C 9/04 (2006.01)
   B05C 9/00 (2006.01)

(56) References Cited

FOREIGN PATENT DOCUMENTS

| CN | 101634779 A | 1/2010 |
| CN | 102151637 A | 8/2011 |
| CN | 202070463 A | 12/2011 |
| CN | 103158344 A | 6/2013 |
| JP | 2003-057666 A | 2/2003 |
| JP | 2004-237150 A | 8/2004 |

OTHER PUBLICATIONS

International Search Report mailed Dec. 19, 2013; PCT/CN2013/078468.

* cited by examiner

ALIGNMENT FILM PRINTING DEVICE

TECHNICAL FIELD

Embodiments of the present invention relate to an alignment film printing device.

BACKGROUND

At present, an alignment film is coated by using an alignment film transfer printing device, specifically, spraying an alignment fluid on a transfer printing roller, making the alignment fluid that is sprayed on the transfer printing roller evenly distributed by means of a blade, and then coating the alignment fluid into display areas of a substrate by using a supporter and an alignment transfer printing plate.

However, in operation of the above alignment film transfer printing device, because the alignment film transfer printing plate is made of an elastic material, and the alignment film transfer printing plate produces elastic deformation upon being pressed on the substrate during transfer printing process, it is difficult to control edge precision of the alignment film and inaccurate to control the thickness of the alignment film, thereby affecting coating quality of the alignment film.

SUMMARY

An objective of the present invention lies in providing an alignment film printing device so as to improve coating quality of an alignment film.

In order to realize the above objective, the present invention provides the following embodiments.

An embodiment of the invention provides an alignment film printing device comprises at least one printing unit, and each the printing unit comprises: a cylinder body with an opening at a bottom and an extract opening provided on top of the cylinder body; a vacuum extractor connected with the extract opening; a plunger provided inside the cylinder body and configured to draw the alignment fluid from the opening to the cylinder body; a vacuum tester provided at the extract opening and configured to monitor a vacuum degree inside the cylinder body and above the plunger; a range finder provided inside the cylinder body and configured to monitor a distance from the plunger to a top of the cylinder body; and a control device in signal communication with the vacuum extractor, the vacuum tester and the range finder respectively and configured to control a volume of the alignment fluid drawn into the cylinder body according to test values of the vacuum tester and the range finder.

For example, the plunger comprises: a plunger main body and a sealing layer fixed on the plunger main body.

For example, the plunger main body and the sealing layer are fixedly connected with each other by a clamp.

For example, the plunger further comprises a protective layer covering on the sealing layer.

For example, the protective layer comprises a resin protective layer.

For example, the range finder comprises a laser range finder.

For example, the printing unit further comprises an air deflector provided inside the cylinder body and above the plunger, and the air deflector comprises a plurality of air vents.

For example, the number of the printing unit is more than one, and a plurality of the printing units is arranged in an array to form a combination.

In the embodiments of the present invention, the alignment film printing device comprises at least one printing unit, and each printing unit comprises: a cylinder body with an extract opening, a vacuum extractor connected with the extract opening, a vacuum tester provided at the extract opening, a plunger provided inside the cylinder body, a range finder configured to monitor the distance from the plunger to the top of the cylinder body, and a control device in signal communication with the vacuum extractor, the vacuum tester and the range finder respectively. In use, the vacuum degree inside the cylinder body and above the plunger is adjusted by the vacuum extractor so as to adjust the plunger and make it move up and down; when the plunger is moving upward, the bottom opening can intake a certain volume of the alignment fluid; the control device controls the volume of the alignment fluid drawn into the cylinder body according to test values of the range finder and the vacuum tester, and then controls the thickness of the alignment film. Compared with the conventional technology, the alignment film printing device provided by the present invention can effectively control edge precision of the alignment film with the help of the opening design of the cylinder body, in the meantime, the suction volume of the alignment fluid is controlled quantificationally by control of the distance from the plunger to the top of the cylinder body, thereby the thickness of the alignment film is controlled accurately, and then coating quality of the alignment film is improved. Further, with the alignment film printing device provided by the present invention, the alignment film is coated without long-time tests, thus increasing efficiency of coating the alignment film.

REFERENCE NUMERALS

1—cylinder body; 2—plunger; 3—air deflector; 4—range finder; 5—vacuum tester; 11—extract opening; 21—plunger main body; 22—sealing layer; 23—protective layer; 24—fastener; 25—slot, 26—air vent, 100—printing unit, 1000—array of printing units, 200—substrate, 300—vacuum extractor, 400—control device.

DETAILED DESCRIPTION

When a conventional alignment film device is used to coat an alignment film, control for edge precision and thickness of the alignment film is inaccurate, and therefore coating quality of the alignment film is affected.

By taking the above into consideration, embodiments of the present invention provide an alignment film printing device, comprising at least one printing unit. Each printing unit comprises: a cylinder body with an opening at the bottom and an extract opening provided on the top of the cylinder body; a vacuum extractor connected with the extract opening; a plunger provided inside the cylinder body and configured to suck an alignment fluid from the opening into the cylinder body; a vacuum tester provided at the extract opening and configured to monitor the vacuum degree inside the cylinder body and above the plunger; a range finder provided inside the cylinder body and configured to monitor the distance from the plunger to the top of the cylinder body; and a control device, in signal communication with the vacuum extractor, the vacuum tester and the range finder respectively and configured to control the volume of the alignment fluid sucked into the cylinder body according to test values of the vacuum tester and the range finder. In the embodiments of the present invention, edge precision of the alignment film is effectively controlled with the help of the opening design of the cylinder body; in the meantime, the suction volume of the alignment fluid is controlled quantificationally by control of the distance from the plunger to the top of the cylinder body, that is to say, the thickness of the alignment film can be controlled accurately, and then coating quality of the alignment film is improved.

In order to facilitate a person skilled in the art to understand the technical solutions of the present invention well, with reference to the accompanying drawings of the description, the embodiments of the present invention are described in detail in the following.

Figure 1:
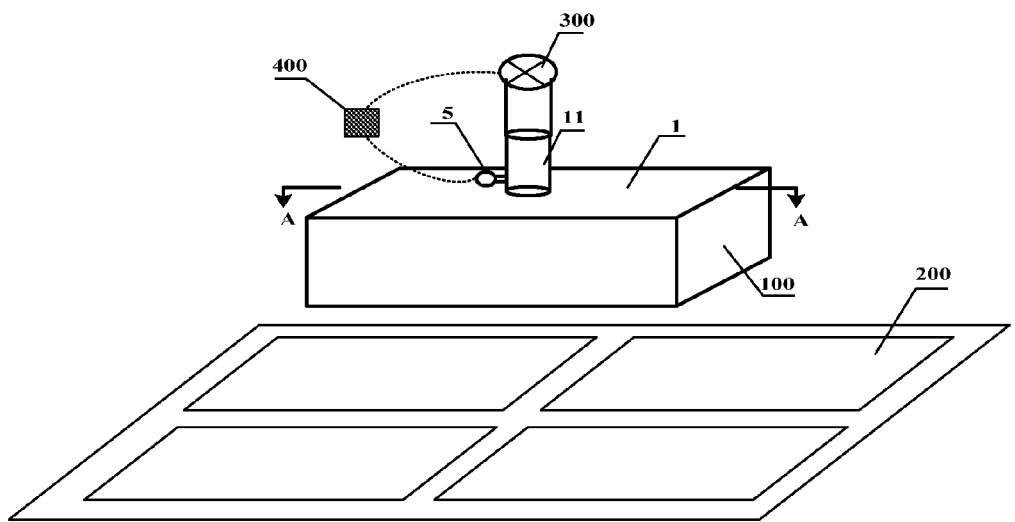
FIG. 1 is a schematic view illustrating a structure of an alignment film printing device provided by an embodiment of the present invention.
Figure 2:
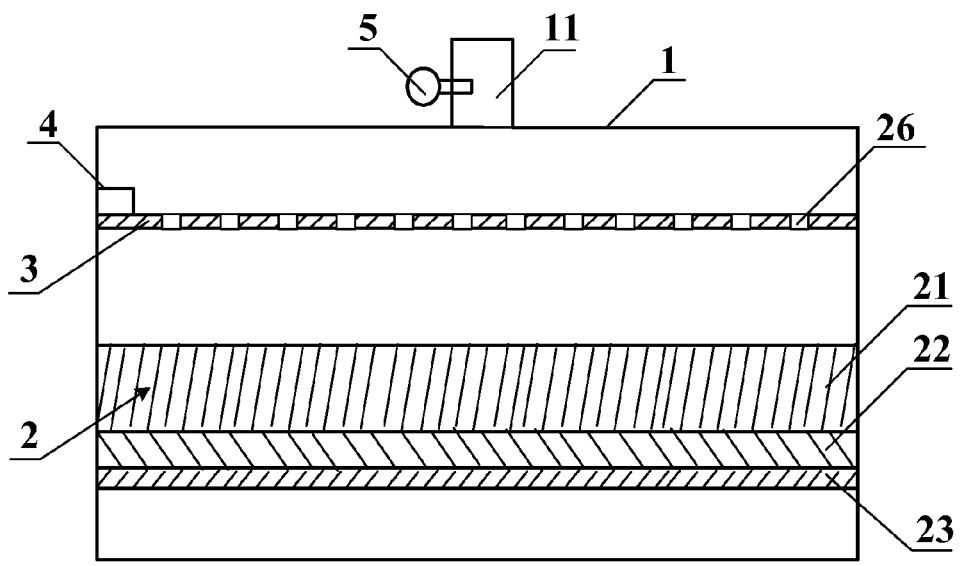
FIG. 2 is a cross-sectional view taken along the A-A direction in FIG. 1.

As illustrated in FIG. 1 and FIG. 2, an alignment film printing device provided by an embodiment of the present invention, comprising at least one printing unit 100, and each printing unit 100 comprises: a cylinder body 1 with an opening at the bottom and an extract opening 11 provided on the top of the cylinder body 1; a vacuum extractor 300 connected with the extract opening 11; a plunger 2 provided inside the cylinder body 1 and configured to suck an alignment fluid from the opening to the cylinder body 1; a vacuum tester 5 provided at the extract opening 11 and configured to monitor the vacuum degree inside the cylinder body 1 and above the plunger 2; a range finder 4 provided inside the cylinder body 1 and configured to monitor the distance from the plunger 2 to the top of the cylinder body 1; and a control device 400, in signal communication with the vacuum extractor 300, the vacuum tester 5 and the range finder 4 respectively, and configured to control the volume of the alignment fluid sucked into the cylinder body 1 according to test values of the vacuum tester 5 and the range finder 4.

In the embodiment of the present invention, the alignment film printing device comprises at least one printing unit 100, and each printing unit 100 comprises: a cylinder body 1 with an extract opening 11, a vacuum extractor 300 connected with the extract opening 11, a vacuum tester 5 provided at the extract opening 11, a plunger 2 provided inside the cylinder body 1, a range finder 4 configured to monitor the distance from the plunger 2 to the top of the cylinder body 1, and a control device 400 in signal communication with the vacuum extractor 300, the vacuum tester and the range finder respectively. In operation, the vacuum degree inside the cylinder body above the plunger 2 is adjusted by the vacuum extractor 300, so as to adjust the moving distance of the plunger 2; when the plunger 2 is moving upward, the bottom opening can intake a certain volume of the alignment fluid; the control device 400 controls the volume of the alignment fluid drawn into the cylinder body 1 according to test values of the range finder 4 and the vacuum tester 5, and then controls the thickness of the alignment film. Compared with the conventional technology, the alignment film printing device provided by the present invention can be used to effectively control edge precision of the alignment film with the help of the opening design of the cylinder body; in the meanwhile, the suction volume of the alignment fluid is controlled quantificationally by controlling the distance from the plunger to the top of the cylinder body, thereby the thickness of the alignment film is controlled accurately, and then coating quality of the alignment film is improved. Further, with the alignment film printing device provided by the present invention, the alignment film is coated without long-time tests, thus increasing efficiency of coating the alignment film; and a more simple structure as well as easier cleaning can be obtained as compared with the conventional alignment film transfer printing device.

Figure 3:
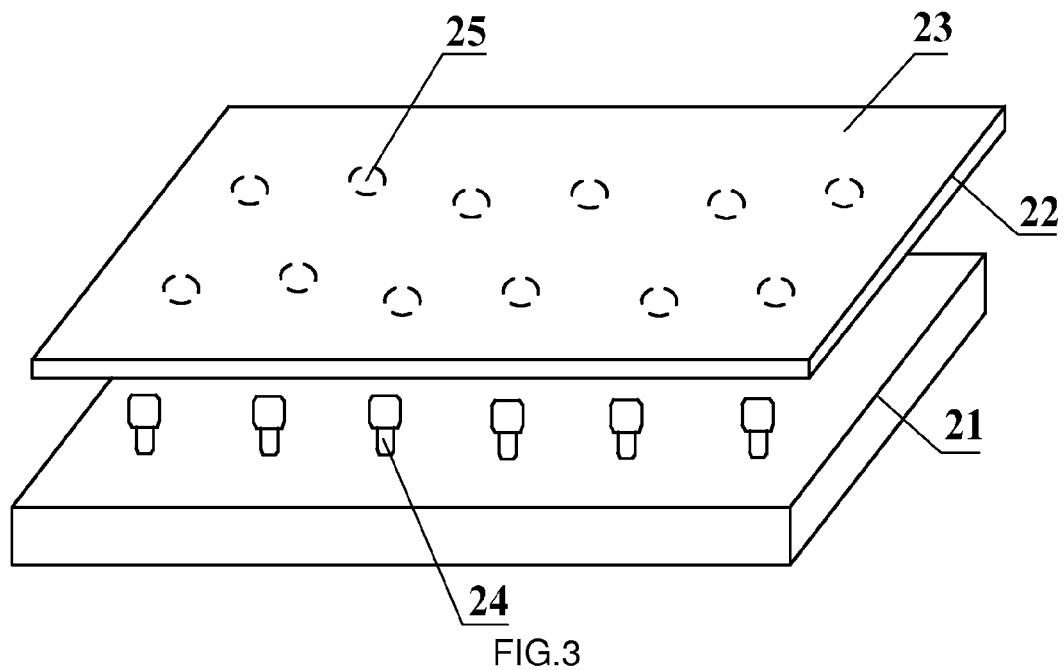
FIG. 3 is a schematic view of the plunger in FIG. 2.

As illustrated in FIG. 3, in a specific embodiment, the plunger 2 comprises: a plunger main body 21 and a sealing layer 22 fixed on the plunger main body 21. In this way, leakproofness inside the cylinder body 1 and above the plunger 2 is guaranteed, with the sealing layer 22, in vacuum pumping process, thus leakage from affecting the suction volume of the alignment fluid is prevented.

For example, the above plunger main body 21 and the sealing layer 22 are securely fastened together, that is, the plunger main body 21 and the sealing layer 22 are fixedly connected with each other by a clamp; and in this embodiment, a plurality of buckles 24 is provided on the plunger main body 21, and a plurality of slots 25 fitting the buckles 24 are provided on the sealing layer 22. Certainly, the plunger main body 21 and the sealing layer 22 can be fixed as a whole in other ways, for example, adhesive or threaded connection or the like.

In order to prevent the alignment fluid from polluting the sealing layer 22 in a printing process, the above-mentioned plunger 2 further comprises: a protective layer 23 covering on the sealing layer 22; the protective layer 23 can effectively prevent the alignment fluid from polluting the sealing layer 22 in a printing process, and in the meantime can also prevent the alignment fluid from being polluted. For example, the protective layer 23 is a resin protective layer; and it is required that this resin protective layer does not react with the alignment fluid at all.

In order to guarantee the monitoring accuracy of the distance from the plunger 2 to the cylinder body 1, for example, the above range finder 4 can be a laser range finder.

Further, the above printing unit 100 may further comprise: an air deflector 3 provided inside the cylinder body 1 and above the plunger 2, and the air deflector 3 has a plurality of air vents 26. In this way, the uniformity of the force applied onto the plunger is guaranteed when the plunger is in operation, namely, a steady vacuum pumping process is guaranteed, thus making the plunger moving smoothly.

Figure 4:
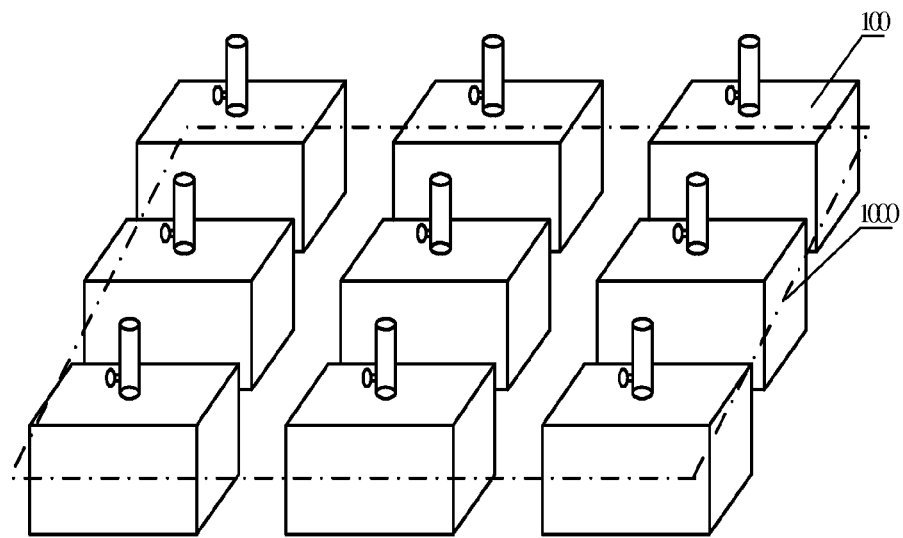
FIG. 4 is a schematic view illustrating a structure of another alignment film printing device provided by the embodiment of the present invention.

As illustrated in FIGS. 1 and 4, a liquid crystal panel is usually formed by dividing a big mother panel into a plurality of small panels; accordingly, when a substrate 200 is coated with an alignment film, it is typical to coat a plurality of alignment areas on a big substrate 200. Therefore, an alignment film printing device usually comprises a plurality of printing units 100. For example, as shown in FIG. 4, a plurality of printing units 100 is arranged in an array 1000 to form a combination. In printing, the combination of the plurality of printing units 100 draws an alignment fluid simultaneously and then prints simultaneously to complete the alignment coating onto the whole liquid crystal panel, which guarantees the alignment film is coated evenly on the whole panel and further increase coating quality of the alignment film.

In summary, with the alignment film printing device provided by the embodiments of the present invention, edge precision of an alignment film can be effectively controlled by the opening design of the cylinder body; the suction volume of an alignment fluid is controlled quantificationally by control of the distance from the plunger to the top of the cylinder body, thereby the thickness of the alignment film is controlled accurately, and then coating quality of the alignment film is improved. Also, a plurality of printing units are arranged in an array to form a combination, in this way, it can be achieved that the combination draws an alignment fluid simultaneously and then prints simultaneously so as to guarantee that the alignment film is coated evenly on the whole panel and to effectively increase coating quality of the alignment film as well. Further, with the alignment film printing device provided by the embodiments of the present invention, the alignment fluid is coated without long-time tests, thus increasing efficiency of coating the alignment film; and a more simple structure as well as easy cleaning can obtained as compared with a conventional alignment film transfer printing device.

It is apparent to a person skilled in the art to make various modifications and variations to the present invention without departing from the spirit and scope of the present invention. In this way, if these modifications and variations belong to the scope of the claims of the present invention and their equivalents, then the present invention is intended to cover these modifications and variations.

The invention claimed is:

1. An alignment film printing device for applying alignment film on a substrate, comprising at least one printing unit, and the printing unit each comprising:
    a cylinder body, with an opening at a bottom and an extract opening provided on a top of the cylinder body;
    a vacuum extractor, connected with the extract opening;
    a plunger, provided inside the cylinder body and configured to draw an alignment fluid from the opening to the cylinder body;
    a vacuum tester, provided at the extract opening and configured to monitor a vacuum degree inside the cylinder body and above the plunger;
    a range finder, provided inside the cylinder body and configured to monitor a distance from the plunger to the top of the cylinder body; and
    a control device, in signal communication with the vacuum extractor, the vacuum tester and the range finder respectively and configured to control a volume of the alignment fluid drawn into the cylinder body according to test values of the vacuum tester and the range finder.

2. The alignment film printing device as claimed in claim 1, wherein the plunger comprises a plunger main body and a sealing layer fixed on the plunger main body.

3. The alignment film printing device as claimed in claim 2, wherein the plunger main body and the sealing layer are fixedly connected with each other by a clamp.

4. The alignment film printing device as claimed in claim 2, wherein the plunger further comprises a protective layer covering on the sealing layer.

5. The alignment film printing device as claimed in claim 4, wherein the protective layer comprises a resin protective layer.

6. The alignment film printing device as claimed in claim 1, wherein the range finder comprises a laser range finder.

7. The alignment film printing device as claimed in claim 1, wherein the printing unit further comprises an air deflector provided inside the cylinder body and above the plunger, and the air deflector comprises a plurality of air vents.

8. The alignment film printing device as claimed in claim 1, comprising a plurality of the printing units, wherein the plurality of the printing units is arranged in an array to form a combination.

9. The alignment film printing device as claimed in claim 3, wherein the plunger further comprises a protective layer covering on the sealing layer.

10. The alignment film printing device as claimed in claim 9, wherein the protective layer comprises a resin protective layer.

11. The alignment film printing device as claimed in claim 2, wherein the printing unit further comprises an air deflector provided inside the cylinder body and above the plunger, and the air deflector comprises a plurality of air vents.

12. The alignment film printing device as claimed in claim 2, comprising a plurality of the printing units, wherein the plurality of the printing units is arranged in an array to form a combination.

13. The alignment film printing device as claimed in claim 3, wherein the printing unit further comprises an air deflector provided inside the cylinder body and above the plunger, and the air deflector comprises a plurality of air vents.

14. The alignment film printing device as claimed in claim 3, comprising a plurality of the printing units, wherein the plurality of the printing units is arranged in an array to form a combination.

15. The alignment film printing device as claimed in claim 4, wherein the printing unit further comprises an air deflector provided inside the cylinder body and above the plunger, and the air deflector comprises a plurality of air vents.

16. The alignment film printing device as claimed in claim 4, comprising a plurality of the printing units, wherein the plurality of the printing units is arranged in an array to form a combination.

17. The alignment film printing device as claimed in claim 9, wherein the printing unit further comprises an air deflector provided inside the cylinder body and above the plunger, and the air deflector comprises a plurality of air vents.

18. The alignment film printing device as claimed in claim 9, comprising a plurality of the printing units, wherein the plurality of the printing units is arranged in an array to form a combination.

19. The alignment film printing device as claimed in claim 7, comprising a plurality of the printing units, wherein the plurality of the printing units is arranged in an array to form a combination.

* * * * *